United States Patent [19]

Adamovich et al.

[11] 4,175,758

[45] Nov. 27, 1979

[54] TANGENTIAL EXPANDER FOR OIL CONTROL PISTON RINGS

[76] Inventors: Anatoly V. Adamovich, 2 ulitsa Mariinoi Roschi, 14a, kv. 35; Lev A. Burov, Kutuzovsky prospekt, 33, kv. 253; Rusaam S. Nemets, Sirenevy bulvar, 57, kv. 50; Efim S. Gorbulev, Tovarischesky pereulok, 9/11, kv. 5, all of Moscow; Boris S. Eremenko, Moskovsky prospekt, 96a, kv. 273, Kharkov; Felix A. Brainman, ploschad Vosstania, 1, kv. 1, Kharkov; Viktor P. Moldavanov, ulitsa Pionerskaya, 10, kv. 6, Odessa; Jury M. Kontsov, ulitsa Krasnova, 14, kv. 29, Odessa; Viktor F. Axenov, ulitsa Grekova, 4, kv. 277, Moscow; Matvei I. Averbukh, ulitsa Pastera, 50, kv. 12, Odessa, all of U.S.S.R.

[21] Appl. No.: 882,203

[22] Filed: Feb. 27, 1978

[51] Int. Cl.² ............................ F16F 1/34; F16F 9/36
[52] U.S. Cl. ..................................... 277/220; 267/1.5
[58] Field of Search ......... 267/1.5; 277/216, 219–222, 277/217, 218, 223, 224

[56] References Cited

U.S. PATENT DOCUMENTS

| | | | |
|---|---|---|---|
| 3,338,582 | 8/1967 | DeBruin | 267/1.5 X |
| 3,381,971 | 5/1968 | Mayhew | 267/1.5 X |
| 3,929,342 | 12/1975 | Morsbach et al. | 267/1.5 X |
| 4,053,165 | 10/1977 | Hartley | 277/216 X |
| 4,130,288 | 12/1978 | Nisper | 277/216 |

*Primary Examiner*—Robert S. Ward, Jr.
*Attorney, Agent, or Firm*—Steinberg and Blake

[57] ABSTRACT

The joint of the expander is formed by tooth-like portions of the side flanges of a U-shaped spring, bent inward and coiled into a ring.

The device comprises a measuring gear which reels off the sinuous profiled spring from a spiral.

The gear has a radial slot receiving the reciprocating cutters acting in conjunction with bending punches which bend the cut-off tooth-like ends of the spring, locked into a joint.

1 Claim, 8 Drawing Figures

TANGENTIAL EXPANDER FOR OIL CONTROL PISTON RINGS

The present invention relates to the design of the internal combustion piston engines and more specifically it relates to tangential expanders for compound oil control piston rings and to devices for making a group of such tangential expanders.

The operating experience gained in the use of compound oil control piston rings covered by the USSR Author's Certificate No. 303448 has proved that such rings not only reduce considerably (to 0.5% and below) the losses of oil for burning but also extend substantially the life of the piston group and of the engines as a whole. Such efficient performance of these rings is due to the introduction of a tangential expander which operates on the principle of a coil spring, ensuring uniform transmission of forces to the flat rings.

Concerning the disadvantages of the prior art expander it should be noted that its joint is formed by straight-cut ends. In such a configuration of the expander ends the compressing force of the tangential expander is applied only through thin vertical connectors which slide relative to each other during assembly of the expanders thus introducing considerable difficulties into the expander jointing operation while the rings are being installed on the piston and the latter is being inserted into the cylinder. Moreover, the use of such expanders has proved that, apart from complicating the assembling operations, the flat rings and expanders installed into the cylinder become often jammed, distorted and rendered unfit for further service.

There are other known designs of prior art expanders. Thus, according to the U.S. Pat. No. 2,817,564 the ends of the expander are welded.

This design is little effective since the expander slipped on the piston has to be stretched by 25-40% which, due to its stiffness, changes its initial geometry and flexibility because of the permanent deformation of the expander material. The strength of the weld on the strip of high-carbon steel is unreliable so that the expander being slipped on the piston may crack along the weld.

The British Pat. Nos. 1284813 and 1364738 and the French Pat. No. 2118801 introduce jointing elements in the form of additional parts made of metal wire or synthetic materials.

These versions of the expanders complicate considerably the manufacture of the rings and their installation on the piston. The joint has to be fixed directly in the piston groove which is unacceptable in large-scale production. The manufacture of such expanders involves additional operations which step up labour consumption and production cost.

And one more U.S. Pat. No. 3,929,342 introduces axial locks for jointing the ends of the expander.

Said axial locks in the claimed design of the expander increase considerably the expenditures of labour in its manufacture and complicate the installation of the rings into the piston grooves. Under the conditions of large-scale production the jointing of the expander ends directly in the piston groove with the use of locks proposed herein is practically impossible.

If the expander ends are jointed outside of the piston groove then the expander has to be stretched while being slipped on the piston (like it is done with the welded-end expanders covered by the U.S. Pat. No. 2,817,564). This will change the initial geometry and flexible properties of the expander.

As to the piston ring expanders and similar parts, we wish to point out that in examining the materials of the prior art knowledge we have discovered only one similar device which we have relied upon as a prior art device. This is the device for making axial expanders (USSR Author's Certificate) comprising a drive, a mechanism for feeding the blanks with the aid of sprockets, mandrels and a cutter for cutting off the expander, actuated by a master form.

This device functions as follows.

The sprockets which corrugate the strip, feed it continuously along the guides onto the rollers for coiling the spiral and delivering it onto a mandrel. Then special sprockets which count the number of corrugations deliver the spiral cyclically into a cutting mechanism wherein the spiral is cut into individual expanders. Then the expanders are delivered along the mandrel axis into a mechanism which ties up the finished expanders into packs constituting complete sets per engine.

This prior art device has the following substantial disadvantages.

The expander is cut off without first fixing the point of cutting which may get displaced when the diameter of winding and the expander length change with the mechanical properties of the strip and changes in its geometry.

The displacement of the cutting point results in changed dimensions of the flanges which form the joint of the axial expander, this being unacceptable in the design of the tangential expander.

The automatic machine has no device for bending the flanges of the expander joint, said bending being necessary for making the joint of the shape ensuring installation of the expander on the piston.

An object of the present invention resides in providing a tangential expander for oil control piston rings comprising a joint designed to ensure easy fitting of the oil control ring on the piston and easy insertion of the piston with rings into the cylinder.

Another object of the present invention resides in providing a tangential expander with the simplest possible and reliable jointing device which does not call for the use of any additional structural elements.

Still another object of the present invention resides in providing a device for cutting the profiled spiral into tangential expanders and for shaping the joint of said tangential expander which would improve the quality of the manufactured expanders with regard to the accuracy of cutting the expander from the spiral with simultaneous bending of the joint-forming flanges by providing the device with a mechanism for counting the spiral turns and a bending-and-cutting mechanism.

And, finally, still another object of the present invention resides in providing a device for cutting the profiled spiral into tangential expanders and for forming the joint of the tangential expander which would be simple in manufacture and servicing and reliable in operation.

To achieve these and other objects according to the present invention, proposed herein is a tangential expander for oil control piston rings in the form of an all-bent circular sinuous spring having a U-shaped cross section with the side flanges bent at the ends into thrust shoulders and provided with a joint at the ends; said expander is characterized in that its joint includes the portions of said U-shaped flanges cut off in the form of teeth at the ends of the sinuous spring, said teeth being bent into the U-shaped profile through a distance equal to not less than the thickness of the spring material plus the height of the thrust shoulder so that each of said teeth constituting the joint is flexibly locked inside the U-shaped profile in the opposite end of the tangential expander.

Such a technical solution offers the simplest and most reliable joint which permits the tangential expander to be held locked during installation of flat rings into the piston grooves and to be flexibly compressed together with the flat rings to a smaller diameter during insertion of the piston with rings into the cylinder liner, thus facilitating this operation.

In accordance with one of the embodiments of the present invention disclosure is made herein of a device for making a group of tangential expanders with a joint comprising a drum wound with a spiral made from a sinuous spring of a U-shaped cross section formed by the side flanges with the thrust shoulders bent off at the ends, a mechanism for cutting the spiral into individual expanders and a receiver for the finished articles characterized in that the kinematic chain for unreeling the profiled spring from the drum-wound spiral comprises a measuring gear for counting the spiral turns, said gear meshing with the sinuous spring and being provided with a radial slot which at the moment of cutting receives the cutters of said cutting mechanism made in the form of two parallel cutting tools reciprocating in the opposite directions in said slot of the gear.

Such a layout of the device permits accurate measurement of the required lengths of the sinuous spring and cutting off the ends of the tangential expander.

In accordance with another embodiment of the present invention disclosure is made of a device wherein each cutting tool comprises two cutters and a bending tool located in one of the cutters and spring-loaded towards the opposite cutter for simultaneous bending in opposite directions of the tooth-like portions of the flanges of the U-shaped spring at the moment of their cutting off by the cutting tools.

Such a layout permits combined shaping of the joint elements, viz., simultaneous cutting of the tooth-like ends of the spring and bending them inward for meshing with the U-shaped profile of the opposite end of the tangential expander.

And in one more embodiment of the present invention disclosure is made of a device characterized in that said gear for counting the turns of the spiral is made in such a manner that within one revolution it reels off a preset measured length sufficient for producing one tangential expander.

This design is one of the optimum versions of the measuring gear permitting unreeling a preset length of the sinuous spring and cutting off the jointing ends of the expander.

Now the invention will be described in detail by way of example with reference to the accompanying drawings in which.

Figure 1:
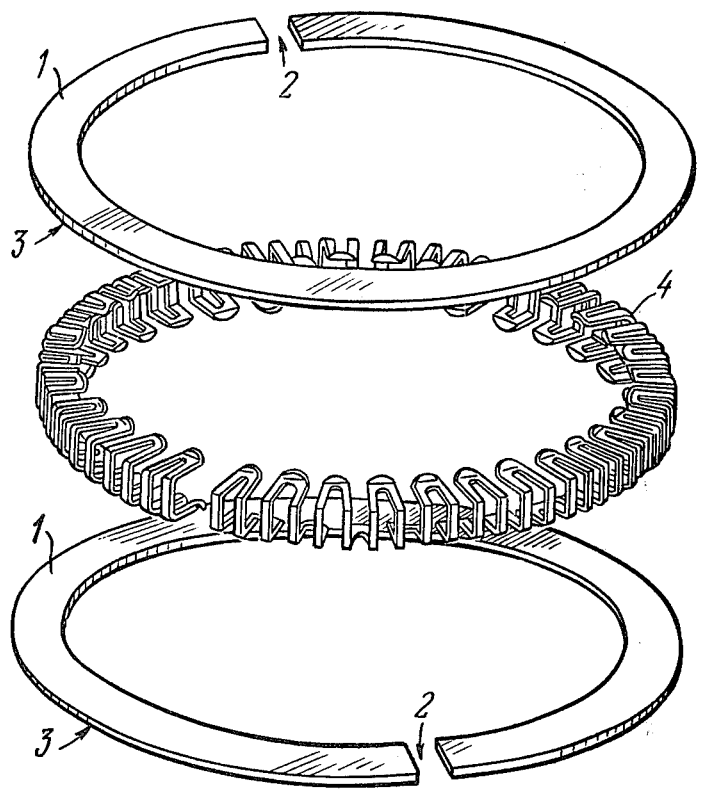
FIG. 1 shows a compound oil control piston ring with a tangential expander.
Figure 2:
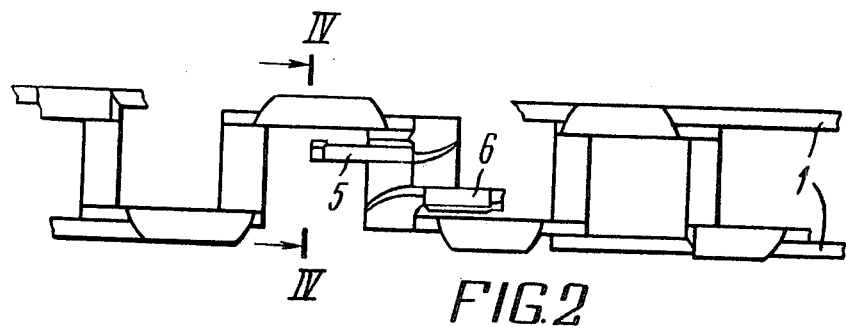
FIG. 2 shows a portion of the tangential expander illustrated in FIG. 1 with a joint according to the present invention (side view complete with flat rings)
Figure 3:
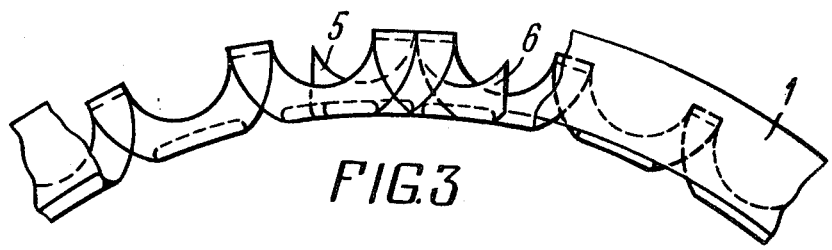
FIG. 3 is a plan view of the portion illustrated in FIG. 2.
Figure 4:
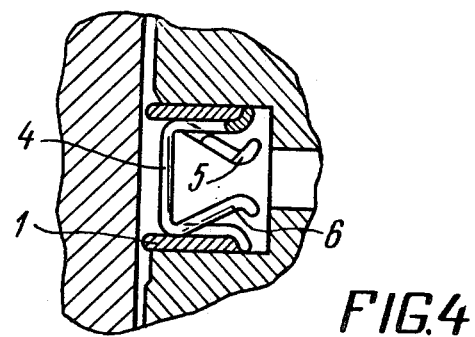
FIG. 4 is a section taken along line IV—IV in FIG. 2.
Figure 5:
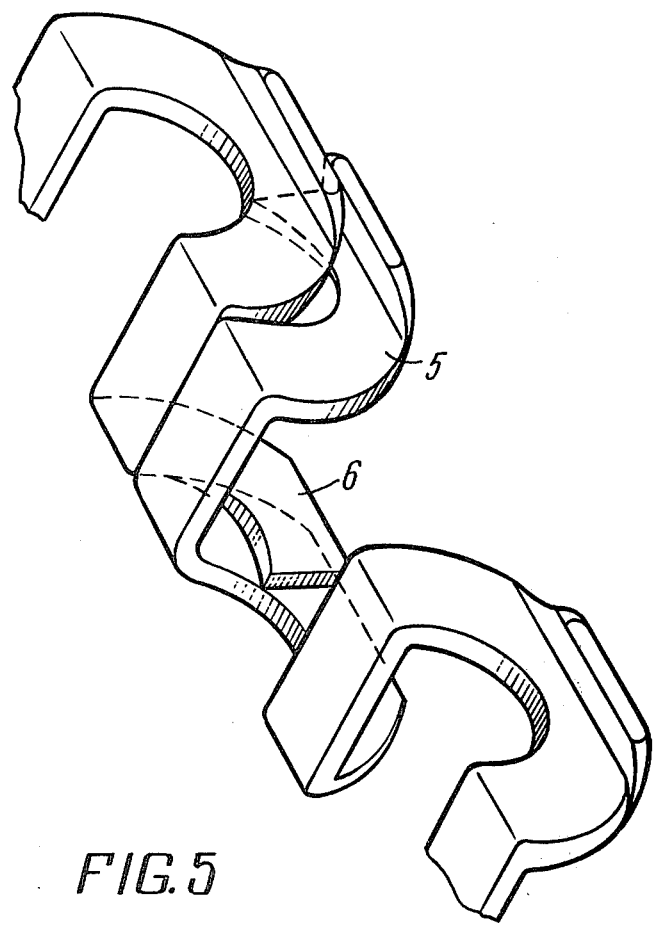
FIG. 5 is an isometric view of the tangential expander joint.

The compound oil control piston ring comprises two chrome-plated flat rings 1 (FIG. 1) intended to distribute uniformly an optimum layer of oil over the cylinder face and to scrape off the surplus oil into the engine oil sump. The flat rings 1 are made in the form of flat circular plates whose diameter is close to the cylinder bore diameter and which are made of high-carbon spring steel strip, flattened and hardened and bent edgewise into regular circles with expansion clearances 2 at the ends which make up for the linear expansion of the rings 1 in the course of operation at temperatures up to 150° C. The working surface 3 of the rings is coated with chrome or molybdenum to promote wear resistance.

The rings 1 are flexible and retain their initial shape during installation on the piston even being stretched by 8–10% across the diameter.

The all-bent tangential expander is designed to ensure guaranteed fitting of the chrome-plated flat rings 1 against the cylinder face and the sides of the piston groove during reciprocation of the piston and to discharge the surplus oil through holes in the piston into the engine oil sump.

The tangential expander 4 is a circular compression spring with a U-shaped cross section and a jointing device at the ends. As mentioned above, the turns of the tangential expander 4 are formed while a high-carbon spring steel flattened strip of a rectangular section with rounded edges is being bent into a corrugated strip followed by bending off thrust shoulders and a U-shaped profile which is coiled into a ring and then heat-treated for imparting flexibility to the tangential expander.

The radial and axial forces transmitted by the tangential expander 4 to the flat rings 1 via the thrust shoulders 5 (FIGS. 2 through 5) and the supporting horizontal flanges 6 are created due to compression of the turns of the tangential expander while the oil control ring is inserted with the piston into the cylinder.

The joint of the tangential expander is intended to ensure efficient installation of the oil control ring on the piston and insertion of the piston with rings into the cylinder.

The joint consists of horizontal supporting flanges 6 of the end turns of the tangential expander and of a U-shaped profile bent inward so that during jointing they can enter the inside space of the U-shaped profile of the opposite turns, keeping the latter against radial and axial displacement.

In the course of operation of the oil control ring the flat rings are constantly pressed against the geometrically-varying surface of the cylinder face and must move freely without jamming and scoring in a radial direction relative to the contacting surfaces of the turns of the tangential expander which, contracting and expanding, move in a tangential direction.

The relative motions of the flat rings and the tangential expander in service are ensured in the given design of the oil control ring owing to the rounded edges of the contacting surfaces made in the flattened steel strip during its manufacture.

Figure 6:
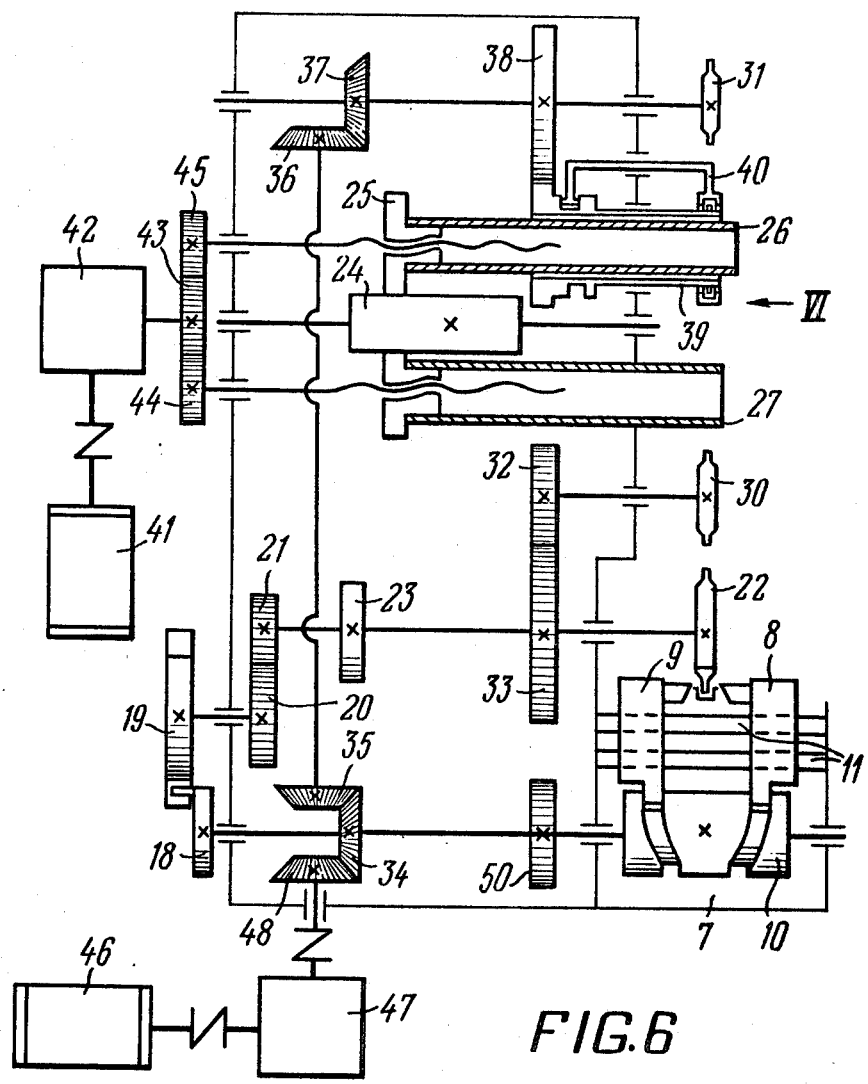
FIG. 6 is a kinematic diagram of the device for making tangential expanders.
Figure 7:
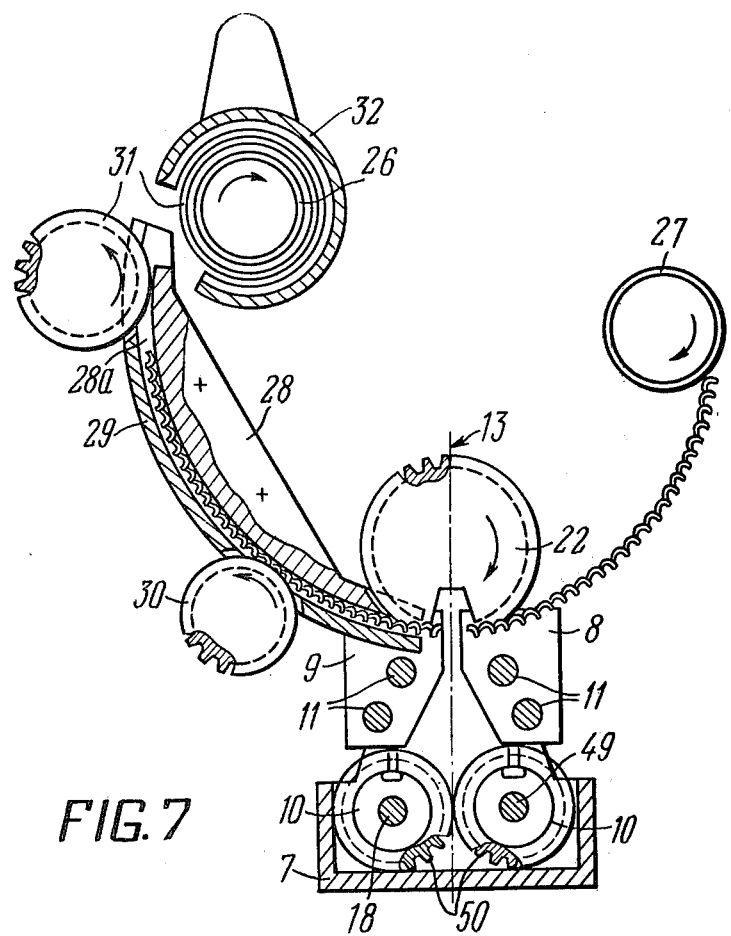
FIG. 7 is a view along arrow 6 in FIG. 6.
Figure 8:
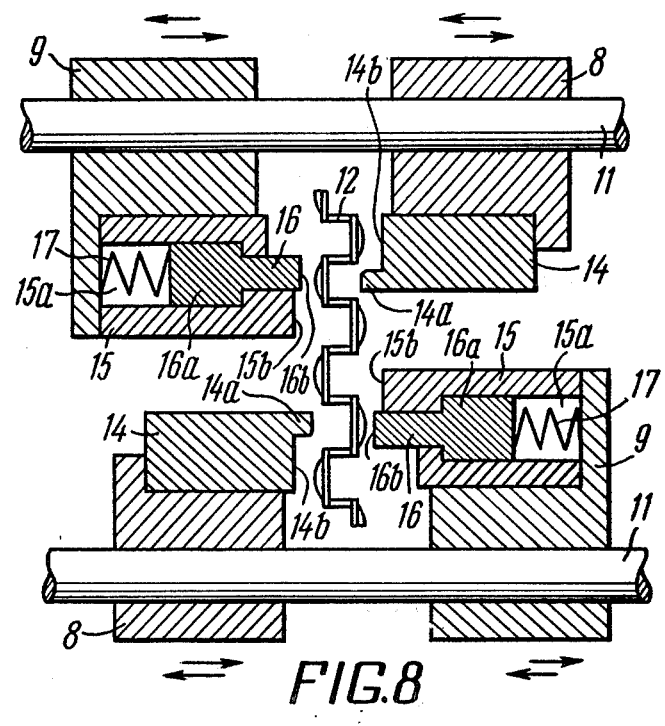
FIG. 8 is a diagram of cutting off the ends of the tangential expander and shaping the joint in the device according to FIG. 6.

The claimed device for making said expanders comprises a bending-and-cutting mechanism 7 (FIGS. 6, 7)

in the form of two pairs of bodies 8, 9 reciprocated by cams 10 over the guide rams 11 in the direction of the profiled strip 12 (FIG. 8).

In this version of the device each pair of the bodies 8, 9 (FIGS. 6, 7) moves over the two guide rams 11 installed symmetrically relative to the central axis 13. Secured on the bodies 8 are thrust cutters 14 (FIG. 8) provided with projections 14a which snap into spaces on the profiled strip 12 and thus set the amount of bending the strip flanges which form the expander joint. The thrust cutters 14 also have surfaces 14b which form supports for the strip 12 to keep it from bending in the process of flange bending and cutting.

The bodies 9 carry cutters 15 with slots 15a accommodating bending punches 16.

The bending punch has a bulge 16a for limiting its travel under the force of the spring 17 and a surface 16b which stands out above the surface 15b of the cutter 15 which ensures first bending then cutting of the profiled strip 12. The bodies 8, 9 in each of the two pairs are arranged so that the thrust cutters 14 or the cutters 15 are located at the opposite sides of the profiled strip (as shown in FIG. 8). This arrangement of the bodies 8 and 9 ensures cutting and simultaneous bending of two ends of the profiled strip 2 forming the expander joint.

Mounted on a common shaft with the cam 10 is the carrier 18 (FIG. 6) of the Maltese mechanism, meshing with the Maltese cross 19 which, in turn, is connected with a disc gear 22 via spur gears 20 and 21. The disc gear 22 has a local cutout in the teeth for the passage of the thrust cutters 14 and cutters 15 (FIG. 7).

The teeth of the disc gear 22 intended to move the profiled strip 12 and to fix it in the course of bending and cutting are cut with a pitch equal to the "turn" of the profiled strip 12, the number of the teeth of the gear 22 being equal to the number of the "turns" sufficient to produce one expander during one revolution of the disc gear 22.

The "turn" of the profiled strip in this case denotes the distance between two spaces of the strip 12.

This design of the disc gear 22 in combination with the flexibility of the profiled strip 12 ensures reliable meshing of the gear 22 with the profiled strip in the course of its movement, and fixing of the strip on the teeth of the gear 22 in the course of bending and cutting.

The disc gear 22 is connected by a gear 23 (FIG. 6) and a wide-tooth gear 24 with nut-gears 25 one of which carries a receiver 26 (FIG. 7) and the other one, a mandrel 27 with a spiral.

For conveying the cut-off expander into the receiver 26, the device is provided with a guide 28 located between the disc gear 22 and the receiver 26. The guide 28 is made in the form of a segment whose curvature ensures the movement of the tangential expander over an arc without unbending which would cause permanent deformation.

The external surface of the segment has a slot 28a. Connected to the guide 28 is a bail 29 forming, together with the guide 28, a closed space which keeps the profiled strip 12 from bulging in the course of its movement.

The bail 29 has slots for moving the sprockets (discs) 30, 31, the sprocket (disc) 30 being connected by the gears 32 and 33 with the disc gear 22 whereas the sprocket (disc) 31 is driven by a shaft with the cam 10 via bevel gears 34–37. The sprocket (disc) 31 is connected via a spur gear 38 with a bushing gear 39 which acts by its helical slot on a lever 40, the latter being intended to throw the finished expander from the surface of the bushing-gear 39 into the receiver 26 which is provided with circular grooves to receive the finished expanders. The receiver 26 and the mandrel with the spiral 27 are withdrawn to the initial position by a high-speed drive comprising an electric motor 41, a reduction unit 42 and spur gears 43, 44, 45. For automatic functioning of the device there is provided a working feed drive comprising an electric motor 46, a reduction unit 47 and a bevel gear 48.

The device functions as follows.

The end of the profiled strip is reeled off the mandrel 27 and hooked to the disc gear 22. Then the electric motor 46 is turned on and its rotation is transmitted via the reduction unit 47 and bevel gears 48 and 34 to the shaft with the cam 10 and carrier 18. Rotating, the carrier 18 turns the Maltese cross 19 through a preset angle and, as a result, the disc gear 22 which is connected with the Maltese cross 19 by the gears 20 and 21 turns one revolution and stops, having moved the profiled strip a certain distance. From the disc gear rotation is transmitted by the gears 33 and 32 to the sprocket (disc) 30 which moves the strip along the guide 28 and, by the gears 23 and 24, to the nut-gears 25 which make a revolution and move axially through a pitch of the motion screw, thus making ready the next vacant groove on the receiver 26 for receiving the expander, and unreeling the profiled strip from the mandrel 27. After the carrier roller leaves the slot in the Maltese cross 19, the cylindrical cams 10 act on the bodies 8 and 9, moving them towards the profiled strip, one of the cams being provided on the carrier 18, while the other, on a shaft 49 rotated by the carrier 18 through the agency of gears 50. Having approached the strip, the bodies 8 with the thrust cutters 14 stop whereas the bodies 9 with the cutters 15 continue moving and their bending punches 16 bend the strip to the thrust cutters 14. Then the bending punches 16 stop but the cutters 15 continue moving relative to the bending punches 16, compress the spring 17 and cut the profiled strip. Then the bodies 8, 9 recede to the initial position.

During the next revolution of the disc gear 28 the cutoff expander is moved over the guide 28 by the sprocket (disc) 30 and by the continuously rotating sprocket (disc) 31 which transfers the expander into the groove of the lever 40, onto the external surface of the bushing-gear 32. The slot of the turning bushing-gear 32 acts on the lever 40 and the latter throws the expander into the groove of the receiver 26.

As soon as the last expander snaps into the slot of the receiver 26, the electric motor 46 stops, the mandrel 27 and the receiver 26 are replaced and withdrawn by the high-speed drive to the initial position.

The above-described device ensures the cutting of the spiral into a group of tangential expanders with the requisite accuracy and forms their joints. After an appropriate heat treatment the finished expanders are used as expanders for the oil control piston rings made of a steel strip in internal combustion engines.

The use in the engines of chrome-plated oil control rings made of a steel strip with tangential expanders, as proved by the stand and operational engine tests, cuts down the loss of sump oil for burning by 0.5% of the fuel consumption which is 1.5–2 times lower than with the use of oil control rings of other designs; the fuel consumption also decreases by 5 g/BHP-h at an average.

It should also be pointed out that the oil control rings made of a steel strip are more technologically processable and can be manufactured by the advanced methods of cold working combined with heat treatment, the effective yield of metal being 93-95% whereas in the manufacture of cast-iron rings made by casting and machining the effective yield of metal is not over 25% in the USSR and 40% abroad.

Bearing in mind that the device according to the present invention ensures cutting of a profiled spiral into expanders with the requisite accuracy and forms a high-quality expander joint which indispensable for mechanized assembly of a piston with rings, involving wide application of the rings of the above-mentioned design, the efficiency of the device is sufficiently high and is proved by the arguments described above.

What is claimed is:

1. A tangential expander for oil control piston rings in the form of a sinuous profiled spring bent into a split ring U-shaped in the cross section, formed by the side flanges bent off at the end in the form of thrust shoulders; a joint connecting the ends of said split ring and made in the form of the cut-off tooth-like portions of the U-shaped profile bent into the U-shaped profile to a distance equal to not less than the sum of the thickness of the initial material of the spring plus the height of the thrust shoulder so that each of said teeth is flexibly locked inside the U-shaped profile in the opposite end of the tangential expander.

* * * * *